(No Model.)
J. S. & T. B. ROWELL.
GRAIN SIEVE.
No. 452,065. Patented May 12, 1891.
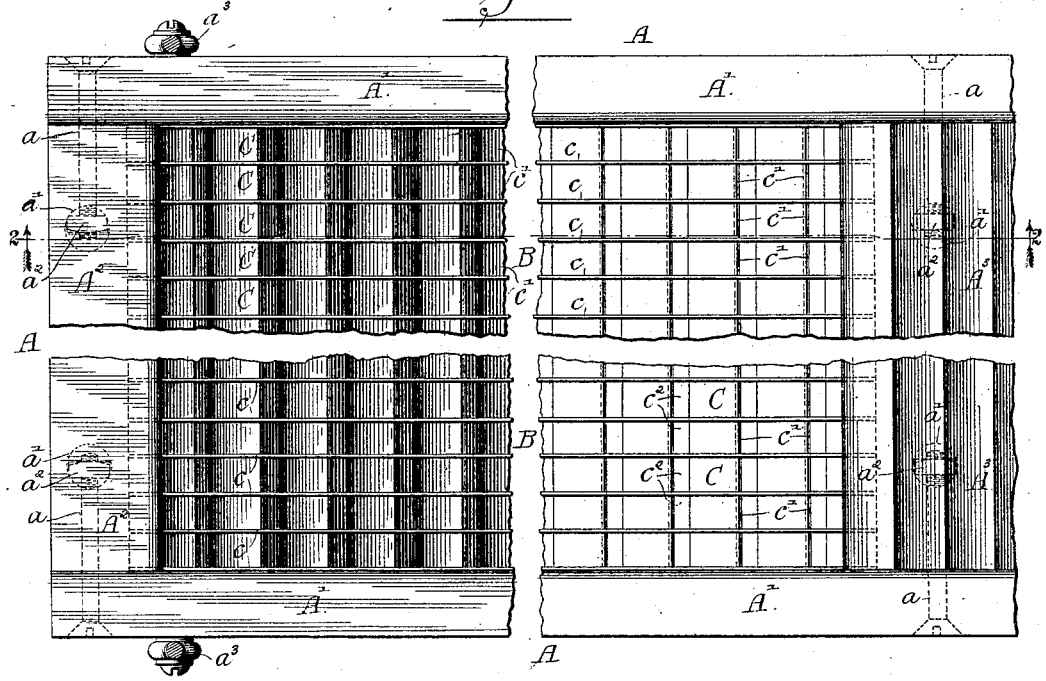
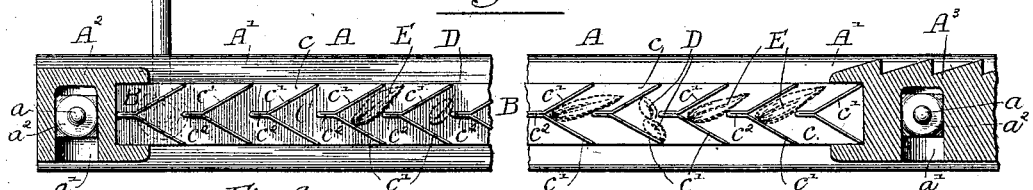
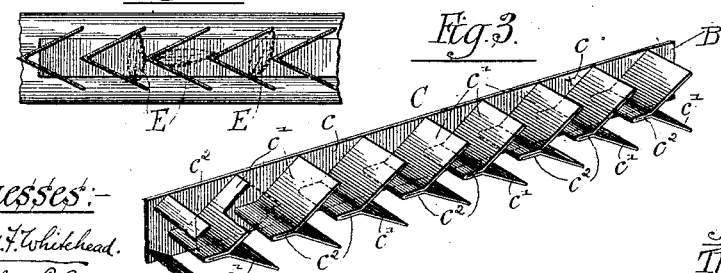
Witnesses:
Louis M. F. Whitehead.
John E. Wiles.
Inventors:
John S. Rowell.
Theodore B. Rowell.
by Dayton, Poole & Brown
Their Attorneys.

UNITED STATES PATENT OFFICE.

JOHN S. ROWELL AND THEODORE B. ROWELL, OF BEAVER DAM, WISCONSIN.

GRAIN-SIEVE.

SPECIFICATION forming part of Letters Patent No. 452,065, dated May 12, 1891.

Application filed January 2, 1891. Serial No. 376,451. (No model.)

*To all whom it may concern:*

Be it known that we, JOHN S. ROWELL and THEODORE B. ROWELL, of Beaver Dam, in the county of Dodge and State of Wisconsin, have invented certain new and useful Improvements in Grain-Sieves; and we do hereby declare that the following is a full, clear, and exact description thereof, reference being had to the accompanying drawings, and to the letters of reference marked thereon, which form a part of this specification.

This invention relates to certain new and useful improvements in the construction of grain-separating sieves, and more particularly to that class of sieves known as "angle-sieves." In this class of sieves as heretofore made the cells have been formed by securing a series of transverse V-shaped strips of sheet metal together by means of longitudinal strips passed through perforations or slits in said V-shaped strips or by being otherwise woven together. A great disadvantage of this form of construction is that the V-shaped strips are liable to slip upon the longitudinal strips, and thereby render some of the cells too large and other cells too small. Another disadvantage of this form of construction is that where the V-shaped strips of metal are slotted or perforated for the passage of the longitudinal strips the edges of the apertures or slots are generally rough, so that the grain is liable to clog in the cells and prevent the proper action of the sieve. Another objection is that by reason of the shape of the cells formed as above described kernels of grain which are too large to pass through the sieve are very liable to catch in said cells by partially turning about the angular point of the V-shaped strip, which forms the rear part of the cell, thus stopping up the cells and preventing the passage of smaller kernels of grain through the sieve. Still another serious disadvantage in sieves of this form of construction, where the longitudinal strips are woven or interlocked with the V-shaped strips, results where one of the pieces forming the sieve is damaged, in which event the entire sieve must either be replaced or must be taken apart in order to be repaired and the damaged strip or section replaced, involving both time and money.

It is the object of the present invention to construct an improved angle-sieve which shall effectually overcome all these objections, which shall also have a much greater capacity for the separation of grains, be cheap, durable, and less liable to require repairs than the sieves heretofore in use; and to this end the invention consists in the matters hereinafter described, and more particularly pointed out in the appended claims.

In the accompanying drawings, illustrating our invention, Figure 1 is a plan view of a sieve constructed in accordance with our invention. Fig. 2 is a longitudinal vertical section of the same on line 2 2 of Fig. 1. Fig. 3 is a perspective view of one of the sections of which the sieve is composed. Fig. 4 is a fragmentary view illustrating the prior form of construction above referred to, here introduced for the purpose of more fully describing our construction and invention.

In said drawings, A indicates as a whole the frame-work of any desired or convenient form of construction, in this instance comprising longitudinal side rails A' A' and end cross-pieces $A^2$ $A^3$. The side rails and end pieces are secured together by any suitable means—as, for example, by the bolts or screws $a$ $a$. As shown more particularly in Figs. 1 and 2 of the drawings, holes $a'$ $a'$ are made in the under sides of the end rails $A^2$ $A^3$, within which nuts $a^2$ $a^2$ are placed, so as to engage with the bolts $a$ $a$.

Motion is communicated to the sieve in any desired manner, the sieve being preferably suspended from links $a^3$ $a^3$, which permit of the longitudinal shaking or vibrating motion desired.

B indicates, as a whole, the sieve proper, which is formed from a plurality of longitudinal sections C C. These sections C C each consists of a longitudinal strip $c$ of sheet metal arranged vertically within the frame and provided with a plurality of angular Y-shaped pieces $c'$ $c'$ also of sheet metal and attached to one or both of the vertical surfaces of said strip $c$. As shown more particularly in Figs.

2 and 3 of the drawings, the angular pieces $c'$ $c'$ are arranged with their apices directed toward the front end of the sieve and their wide or flaring ends toward the rear or discharge end of the screen. These angular Y-shaped pieces are preferably arranged as shown more particularly in Fig. 2, each with its extended and relatively horizontal point $c^2$ terminating about on a vertical line, which would pass through the two rear ends of the angular piece next in advance of it. The size of the cells may, of course, be varied, so as to adapt the screen for use in separating any desired kind of grain. The particular form shown in the drawings is designed for use in separating wheat from larger grains, such as oats.

By reference to Fig. 4 of the drawings it will be seen that grains larger than wheat D— such as oats E, &c.—can partially turn the angles formed by the rear walls of the cells and are liable to become caught within the cells, so as to prevent the passage of grains of wheat, thus clogging the sieve as they become wedged in the cells and are not moved either forward or backward by the vibration of the sieve. This clogging up of the cells is occasioned by the particular shape of the cells. By reference to said Fig. 4 it will be observed that the distance from point to point of the V-shaped strips is the same as between their corresponding rear edges, so that kernels of grain—such as short oats—while they cannot readily pass entirely through the cells, can still easily get into the positions indicated at E in dotted lines in said figure.

By reference to Fig. 2 of the drawings it will be seen that the distance from point to point of the cells in our improved screen is considerably shorter in proportion to the size of the cells, so that kernels E larger than grains D of wheat cannot turn the angles formed by the walls of the cells. As shown by dotted lines in said figure, all such large kernels will pass into the cells and will strike against the lower inclined sides of the same, and are thereby prevented from turning the angles and passing through or clogging up the cells. By the longitudinal motion of the sieve of our construction these large-sized kernels, not being wedged in the cells, are caused to work backwardly to the discharge end of the sieve, being prevented from moving forward by the formation of the cells. In this manner the large-sized kernels are prevented from passing through or from clogging the sieve, as commonly happens in the forms of angle sieves heretofore used, while the grains of wheat and all smaller grains pass freely through the sieve as they readily turn the angles formed by the forward ends $c^2$ $c^2$ of the Y-shaped pieces $c'$ $c'$. It is obvious, therefore, that the capacity of the sieve for the separation of grain is largely increased from the fact that the cells are at all times kept clear from the large-sized kernels of grain and never become clogged.

Another advantage gained by the construction herein described results from constructing the sieve of narrow sections, as shown, whereby in case of damage to one or more of said sections it is only necessary to loosen the bolts or screws $a$ $a$ and to remove one of the side pieces of the frame when damaged section or sections may be removed, new sections substituted, and the entire series of sections again clamped together at the expenditure of the minimum amount of time and money.

The Y-shaped pieces $c'$ $c'$ are preferably attached to the longitudinal strips $c$ $c$ by soldering, there being no slits or perforations in either the angular pieces or the longitudinal strips. By this construction, therefore, all the cells are rendered uniform, the pieces forming the cells are not permitted to shift from their respective positions, and the walls of the cells are rendered perfectly smooth, so as not to offer any rough edges against which the kernels of grain can lodge. By employing larger or smaller cells the sieve may obviously be adapted for use in the separation of any desired kind of grains.

What we claim as our invention is—

1. The herein-described grain-sieve, comprising a plurality of longitudinal removable sections, each of said sections being formed from a vertically-arranged strip of sheet metal provided with a plurality of angular pieces of sheet metal, substantially as described.

2. The herein-described grain-sieve, comprising a plurality of parallel longitudinal sections extending from end to end of the sieve, each section being composed of a vertically-arranged strip of sheet metal provided upon one or both of its vertical surfaces with a plurality of angular Y-shaped pieces of sheet metal, and means for removably securing said sections together, substantially as described.

3. The combination, with the frame of a grain-sieve, of a plurality of vertically-arranged partitions of sheet metal extending from end to end of said frame, and a plurality of Y-shaped pieces of sheet metal attached to each of said longitudinal strips and having their apices all directed toward the front end of the sieve, substantially as described.

4. In a grain-sieve, a plurality of longitudinal sections, each formed from a strip of sheet metal provided with a plurality of Y-shaped pieces of sheet metal, said Y-shaped pieces being each arranged with its forward end or apex substantially even or on a line with the flaring or expanded rear ends of the piece next in advance of it, substantially as and for the purpose specified.

5. As a new article of manufacture, a sieve comprising a plurality of longitudinal sections removably secured in a suitable frame, each section comprising a vertical metal strip, as C, having secured thereto a plurality of transverse angular pieces $c'$ $c'$, each provided with a relatively-horizontal extension directed toward the flaring ends of the next preceding angular piece $c'$, substantially as described.

In testimony that we claim the foregoing as our invention we affix our signatures in presence of two witnesses.

JOHN S. ROWELL.
THEODORE B. ROWELL.

Witnesses:
H. W. KEYES,
L. W. BARBER.